US012726067B2

(12) United States Patent
Tangudu et al.

(10) Patent No.: US 12,726,067 B2
(45) Date of Patent: Sep. 1, 2026

(54) SWITCHED RELUCTANCE ELECTRIC MACHINE

(71) Applicant: Hamilton Sundstrand Corporation, Charlotte, NC (US)

(72) Inventors: Jagadeesh K. Tangudu, South Windsor, CT (US); Andreas C. Koenig, Rockford, IL (US); Suman Dwari, Vernon, CT (US); Todd A Spierling, Rockford, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 233 days.

(21) Appl. No.: 18/615,537

(22) Filed: Mar. 25, 2024

(65) Prior Publication Data

US 2025/0079920 A1 Mar. 6, 2025

Related U.S. Application Data

(60) Provisional application No. 63/536,237, filed on Sep. 1, 2023.

(51) Int. Cl.
*H02K 3/24* (2006.01)
*B64D 27/30* (2024.01)
(Continued)

(52) U.S. Cl.
CPC ............... *H02K 3/24* (2013.01); *B64D 27/30* (2024.01); *B64D 33/08* (2013.01); *H02K 1/246* (2013.01); *H02K 9/193* (2013.01); *H02K 11/04* (2013.01)

(58) Field of Classification Search
CPC .......... H02K 3/24; H02K 1/246; H02K 9/193; H02K 11/04; B64D 27/30; B64D 33/08
See application file for complete search history.

(56) References Cited

U.S. PATENT DOCUMENTS 5,523,635 A 6/1996 Ferreira et al.
7,692,357 B2 4/2010 Qu et al.
(Continued)

FOREIGN PATENT DOCUMENTS

CN 103296944 A 9/2013
DE 102012218830 A1 5/2014
(Continued)

OTHER PUBLICATIONS

Extended European Search Report for EP Application No. 24195870.1, dated Jan. 24, 2025, pp. 1-12.
(Continued)

*Primary Examiner* — Terrance L Kenerly
(74) *Attorney, Agent, or Firm* — CANTOR COLBURN LLP

(57) ABSTRACT

Aircraft electric machines are described. The aircraft electric machines include a laminated rotor operably connected to a shaft, the laminated rotor comprising a plurality of rotor teeth and air gaps defined between adjacent rotor teeth about a circumference of the laminated rotor, a modular stator assembly comprising at least one stator segment having a winding wrapped about a center body of the at least one stator segment, a cooling element arranged at least one of adjacent to or within the winding, and at least one power module system comprising an active rectifier and wherein the laminated rotor and modular stator are arranged as a switched reluctance rotor-stator assembly.

20 Claims, 10 Drawing Sheets

(51) Int. Cl.

| | |
|---|---|
| ***B64D 33/08*** | (2006.01) |
| ***H02K 1/24*** | (2006.01) |
| ***H02K 9/193*** | (2006.01) |
| ***H02K 11/04*** | (2016.01) |

(56) References Cited

U.S. PATENT DOCUMENTS

| | | | |
|---|---|---|---|
| 7,825,552 B2 | 11/2010 | Husband et al. | |
| 9,735,630 B2 | 8/2017 | Chong et al. | |
| 9,742,243 B2 | 8/2017 | Fairall et al. | |
| 11,581,772 B2 | 2/2023 | Osama et al. | |
| 11,804,746 B2 | 10/2023 | Bodla et al. | |
| 11,870,311 B2 | 1/2024 | Brown | |
| 2012/0025636 A1* | 2/2012 | Roopnarine | H02K 3/50<br>310/46 |
| 2013/0221889 A1* | 8/2013 | Kim | H02K 1/141<br>310/48 |
| 2013/0285488 A1 | 10/2013 | Kazmin et al. | |
| 2021/0013757 A1 | 1/2021 | Petrov et al. | |
| 2021/0044159 A1 | 2/2021 | Sawata et al. | |
| 2022/0255401 A1* | 8/2022 | Czarnik | H02K 7/003 |
| 2023/0138133 A1 | 5/2023 | Alahyari et al. | |

FOREIGN PATENT DOCUMENTS

| | | |
|---|---|---|
| FR | 3037450 A1 | 12/2016 |
| KR | 20230012393 A | 1/2023 |
| SE | 517323 C2 | 5/2002 |

OTHER PUBLICATIONS

Liaw et al., "Switched-Reluctance Motor Drive for More Electric Aircraft With Energy Storage Buffer", IEEE Transactions on Aerospace and Electronic Systems, vol. 59, No. 6, Dec. 2023, pp. 7423-7439.

European Office Action for Application No. 24195870.1, mailed Feb. 19, 2026, 10 pages.

* cited by examiner

SWITCHED RELUCTANCE ELECTRIC MACHINE

CROSS-REFERENCE TO RELATED APPLICATIONS

This application claims the benefit of U.S. Provisional Application Ser. No. 63/536,237, filed Sep. 1, 2023, the disclosure of which is incorporated herein by reference in its entirety.

BACKGROUND

The present disclosure relates to electric machines, and more particularly, to electric machine assemblies having switched reluctance with high efficiency and power density with light weight for aircraft applications.

Traditional electric motors may include a stator and a rotor, with electrical motor windings in the stator that, when energized, drive rotation of the rotor about a central axis. Current off-the-shelf power generation systems, such as electric motors/generators are typically optimized for specific operating conditions and are not easily adapted to meet changing military mission requirements. For example, current state-of-the-art (SOTA) power generator systems are typically wound field generators. Although these are very reliable, such wound field generators tend to be bulky and expensive. Additionally, SOTA generators tend to have relatively low efficiencies (88-90%), and relatively low power density (1 kW/lb), at a relatively high cost (1.5 $/W), with passive rectifiers requiring output filters to meet power quality requirements.

Further, heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume, weight, and/or complexity to the motor, due to the addition of, at least, the jacket.

BRIEF DESCRIPTION

According to some embodiments of the present disclosure, aircraft electric machines are provided. The aircraft electric machines include a laminated rotor operably connected to a shaft, the laminated rotor comprising a plurality of rotor teeth and air gaps defined between adjacent rotor teeth about a circumference of the laminated rotor, a modular stator assembly comprising at least one stator segment having a winding wrapped about a center body of the at least one stator segment, a cooling element arranged at least one of adjacent to or within the winding, and at least one power module system comprising an active rectifier and wherein the laminated rotor and modular stator are arranged as a switched reluctance rotor-stator assembly.

In addition to one or more of the features described herein, or as an alternative, further embodiments of the aircraft electric machines may include that the center body is a first center body and the at least one stator segment comprises a second center body adjacent the first center body, wherein the first center body is wrapped with a respective first winding and the second center body is wrapped with a respective second winding.

In addition to one or more of the features described herein, or as an alternative, further embodiments of the aircraft electric machines may include that the at least one power module is configured to selectively direct current into the first winding and the second winding.

In addition to one or more of the features described herein, or as an alternative, further embodiments of the aircraft electric machines may include a cooling system configured to supply a cooling fluid into the cooling element to provide cooling to the winding.

In addition to one or more of the features described herein, or as an alternative, further embodiments of the aircraft electric machines may include that the cooling system comprises a cold plate and at least one fluid connector configured to fluidly connect the cold plate to the winding and provide a flow path for the cooling fluid.

In addition to one or more of the features described herein, or as an alternative, further embodiments of the aircraft electric machines may include that the cooling element is a first cooling element arranged on a first side of the winding, the aircraft electric motor further comprising a second cooling element arranged on a second side of the winding opposite the first cooling element.

In addition to one or more of the features described herein, or as an alternative, further embodiments of the aircraft electric machines may include that the first cooling element is fluidly connected to the second cooling element by at least one fluid connector.

In addition to one or more of the features described herein, or as an alternative, further embodiments of the aircraft electric machines may include that the first cooling element and the second cooling element are arranged in series such that a cooling fluid will pass through the first cooling element and then the second cooling element.

In addition to one or more of the features described herein, or as an alternative, further embodiments of the aircraft electric machines may include a cold plate configured to supply the cooling fluid into the first cooling element and receive the cooling fluid from the second cooling element.

In addition to one or more of the features described herein, or as an alternative, further embodiments of the aircraft electric machines may include that the cooling element comprises a primary cooling body arranged in a radial orientation relative to the shaft and at least one secondary cooling extension that extends from the primary cooling body in a direction tangential or circumferential relative to the shaft.

In addition to one or more of the features described herein, or as an alternative, further embodiments of the aircraft electric machines may include that the primary cooling body is arranged adjacent the winding and the at least one secondary cooling extension extends into the winding.

In addition to one or more of the features described herein, or as an alternative, further embodiments of the aircraft electric machines may include that each of the primary cooling body and the at least one secondary cooling extension define internal cooling channels to receive a cooling fluid to pick up heat from the winding.

In addition to one or more of the features described herein, or as an alternative, further embodiments of the aircraft electric machines may include that the at least one secondary cooling extension comprises two or more secondary cooling extensions that are arranged at different radial positions along the primary cooling body.

In addition to one or more of the features described herein, or as an alternative, further embodiments of the aircraft electric machines may include that at least one of the primary cooling body and the at least one secondary cooling extension comprise a secondary cooling feature configured to provide cooling to material of the at least one stator segment.

In addition to one or more of the features described herein, or as an alternative, further embodiments of the aircraft electric machines may include that neither the laminated rotor nor the modular stator include a magnet.

In addition to one or more of the features described herein, or as an alternative, further embodiments of the aircraft electric machines may include that the air gap defined between adjacent rotor teeth are configured to define a reluctance path within the laminated rotor.

According to some embodiments, aircraft are provided. The aircraft include an aircraft engine, an electric machine, at least one electrical device, and a power bus electrically connecting the at least one electrical device to at least the electric machine. The electric machine includes a laminated rotor operably connected to a shaft, the laminated rotor comprising a plurality of rotor teeth and air gaps defined between adjacent rotor teeth about a circumference of the laminated rotor, a modular stator assembly comprising at least one stator segment having a winding wrapped about a center body of the at least one stator segment, a cooling element arranged at least one of adjacent to or within the winding, and at least one power module system comprising an active rectifier and wherein the laminated rotor and modular stator are arranged as a switched reluctance rotor-stator assembly.

In addition to one or more of the features described herein, or as an alternative, further embodiments of the aircraft may include a cooling fluid reservoir fluidly coupled to the cooling element to provide a cooling fluid into the cooling element to cool the winding.

In addition to one or more of the features described herein, or as an alternative, further embodiments of the aircraft may include a fluid pump configured to pump the cooling fluid from the cooling fluid reservoir into and through the cooling element, wherein the pump is powered by the electric machine.

In addition to one or more of the features described herein, or as an alternative, further embodiments of the aircraft may include that the shaft is a shaft of the aircraft engine.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
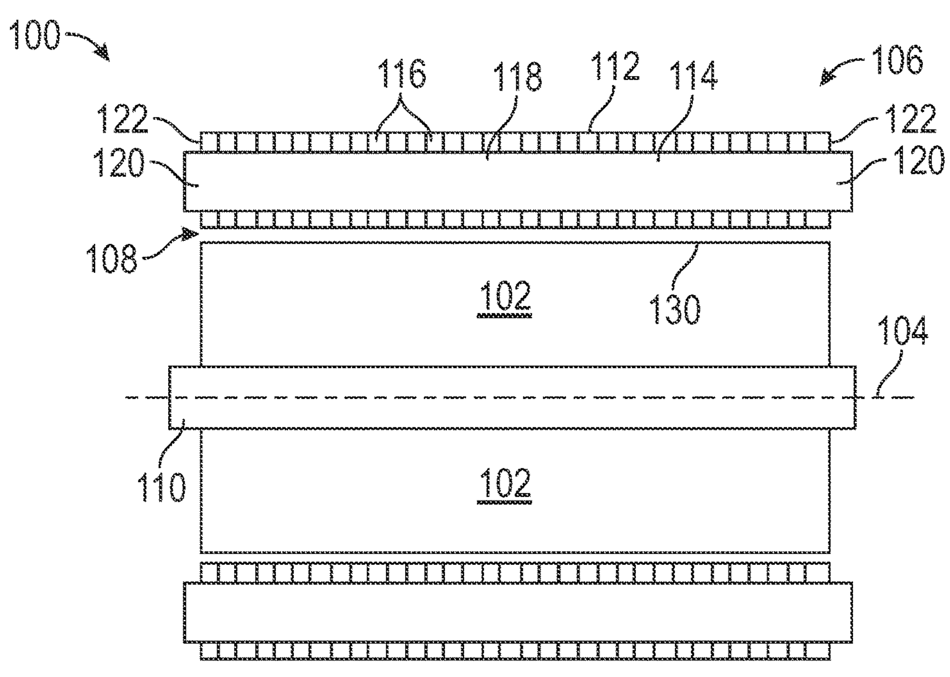
FIG. 1A is a partial view of an embodiment of an electric motor.
Figure 1B:
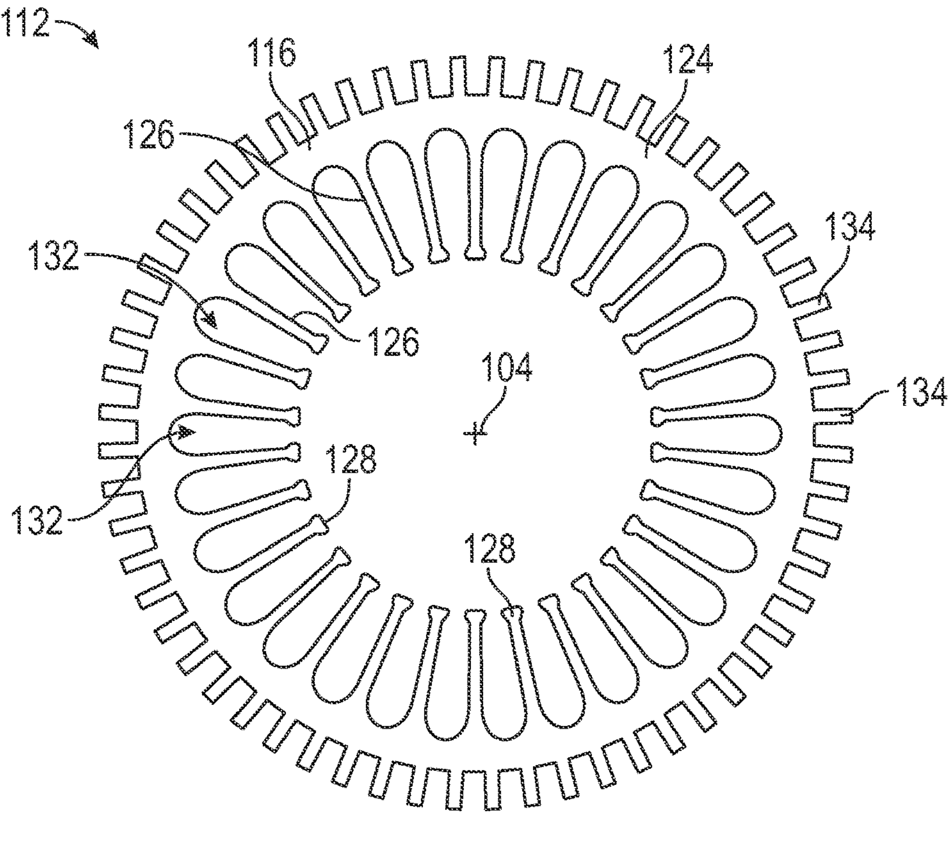
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system.

Figure 2A:
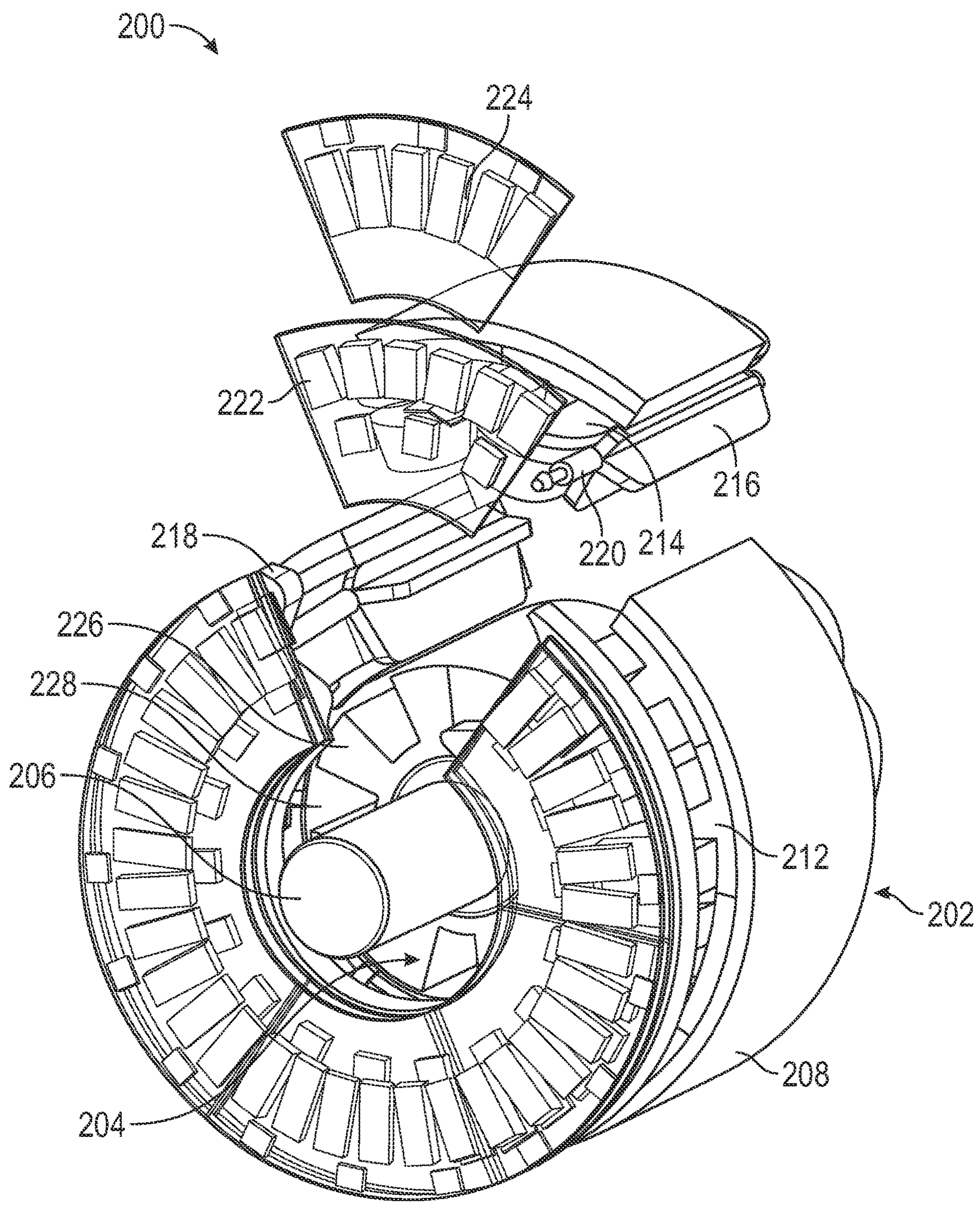
FIG. 2A is a schematic illustration of an electric machine in accordance with an embodiment of the present disclosure, illustrating a partially separated view thereof.
Figure 2B:
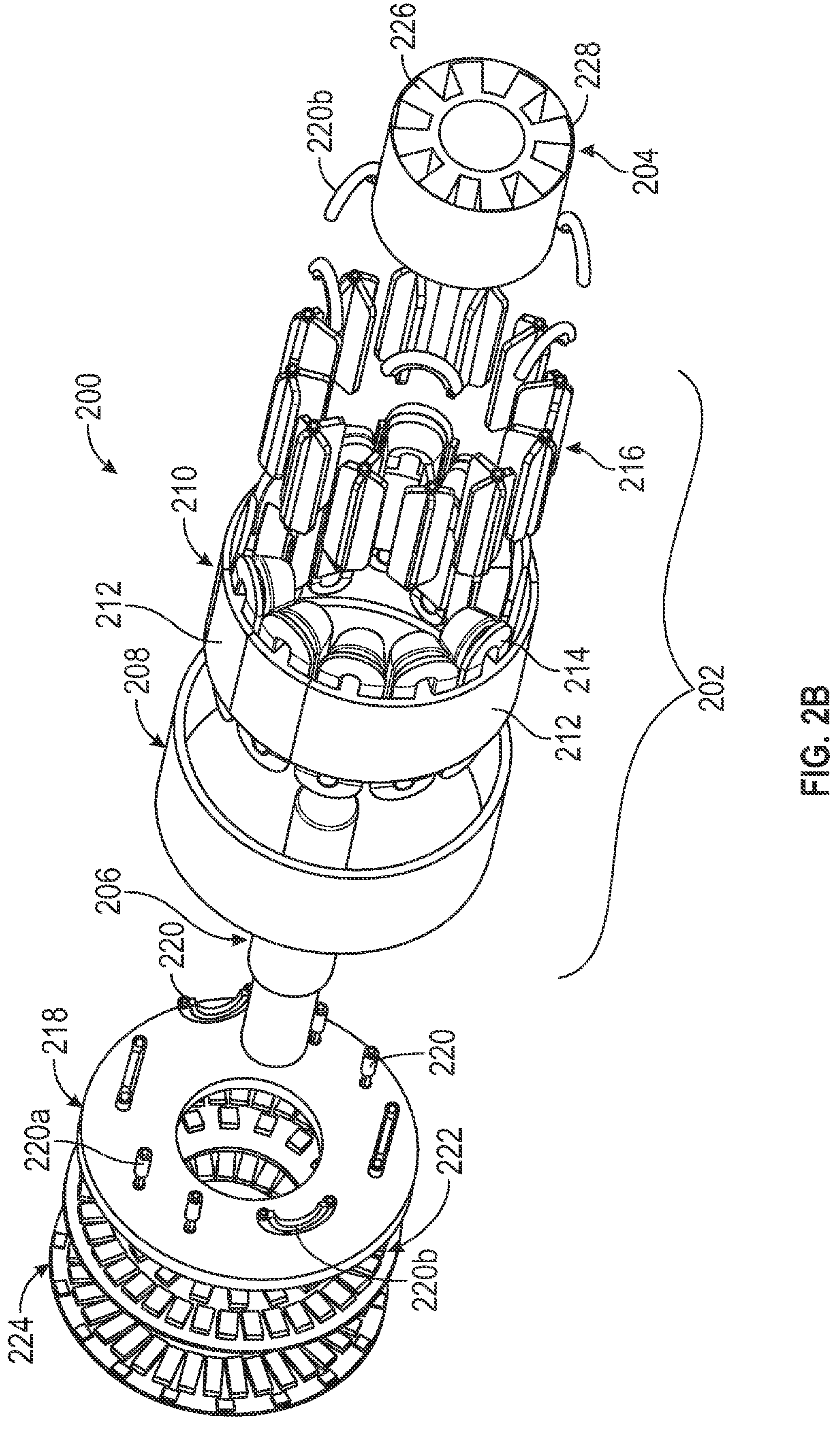
FIG. 2B illustrates an exploded view of the components of the electric machine of FIG. 2A.
Figure 2C:
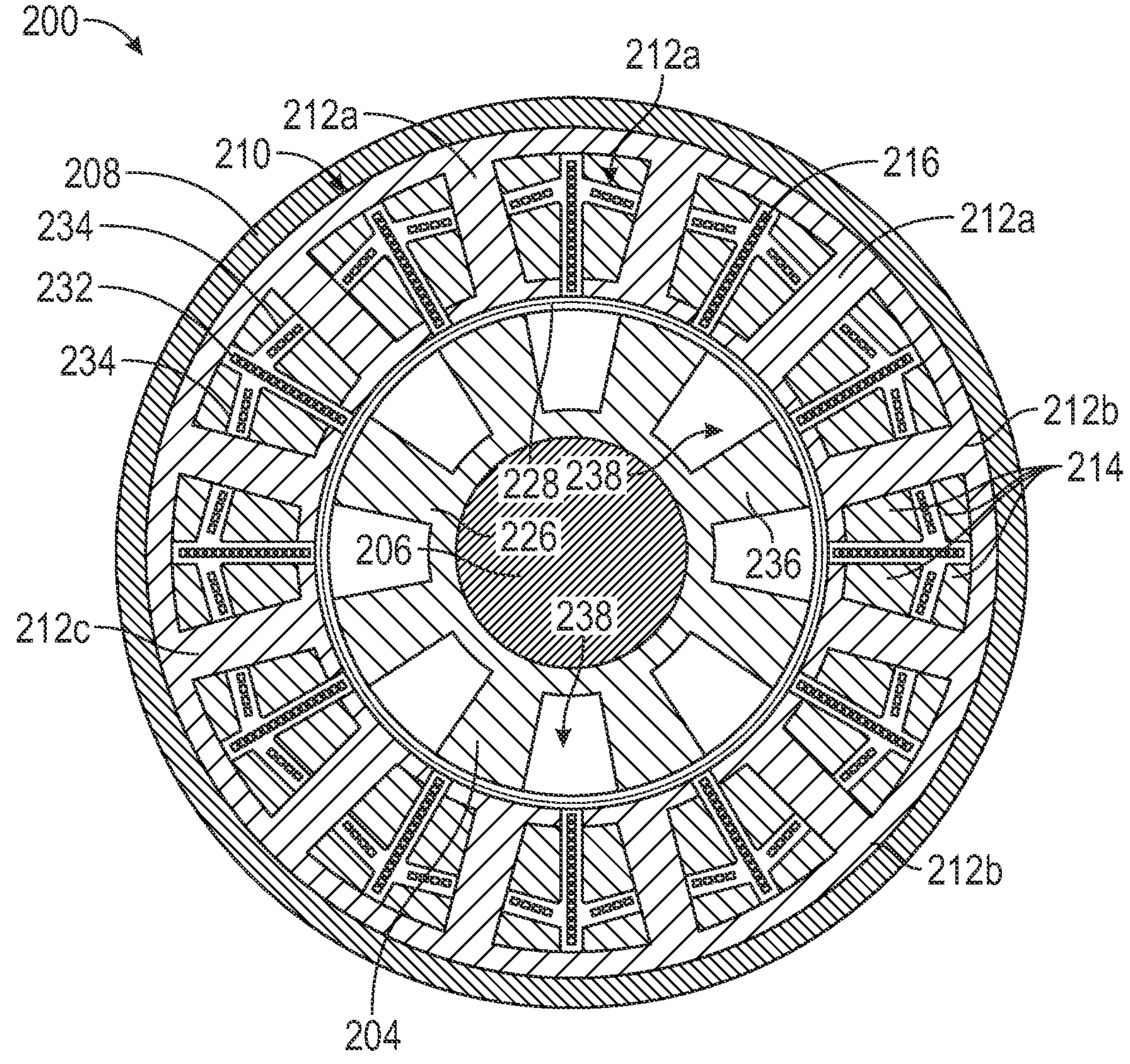
FIG. 2C is a cross-sectional illustration of a portion of the electric machine of FIG. 2A.

FIGS. 2A-2C illustrated views of an electric machine 200 according to an embodiment of the present disclosure. The electric machine 200, as shown in in FIG. 2A, has a portion of a stator removed for illustrative purposes and FIG. 2B illustrates the electric machine 200 in an exploded or partially separated view. FIG. 2C illustrates an end-on or axial view of the electric machine 200 illustrating a configuration of the stator and rotor thereof. The electric machine 200 may be a motor (i.e., electrical power in, mechanical power out) or a generator (i.e., mechanical power in, electrical power out). The electric machine 200 includes a stator 202 and a rotor 204. In a motor configuration, the stator 202 may receive electrical power as an input and impart a motive force to cause rotation of the rotor 204. In a generator configuration, the rotor 204 may be rotationally driven by a shaft 206 to input and impart a motive force to cause rotation of the rotor 204 which in turn will induce an electrical current within the stator 202 to then output electrical power.

The stator 202 includes a frame 208 which supports and contains a stator assembly 210 (labeled in FIGS. 2B-2C) having stator segments 212 with windings 214 wrapped thereabout. The stator segments 212 may be configurated as individual units (e.g., single tooth with winding about the tooth) or multiple teeth along the same backing structure, such as shown in FIG. 2C and illustrated by different configuration stator segments 212*a*, 212*b*, 212*c*, and as discussed in further detail herein. The stator assembly 210 has cooling elements 216 installed relative to the windings 214 to provide cooling thereto. The cooling elements 216 may be arranged within slots, gaps, spaces, or the like to provide cooling to the windings 214. As such, the cooling elements 216 can be disposed between stator windings 214 and, as shown in greater detail below, the cooling elements 216 can define channels that extend into the windings 214 themselves in one or more embodiments.

Control, electrical, and thermal aspects of the electric machine 200 may be provided through various components that are arranged relative to the electric machine 200. For example, as shown, the electric machine 200 includes a cold plate 218 with fluid connectors 220 that are arranged to supply a cooling fluid into the cooling elements 216. The cold plate 218 may be a semi-hollow plate with internal fluid paths and passages for conveying a fluid through the cold plate 218 and into the fluid connectors 220. The fluid will then enter the cooling elements 216 and pass through internal cooling channels within the cooling element 216 to pick up heat from the windings 214. As illustratively shown, the fluid connectors 220 include both cold plate elements 220*a* and stator section elements 220*b*. The cold plate elements 220*a* of the fluid connectors 220 are arranged to provide a fluid connection between the cold plate 218 and a cooling element 216 and the stator section elements 220*b* of the fluid connectors 220 are arranged to provide fluid connection from one cooling element 216 to an adjacent cooling element 216. As a result, the cold plate 218 and the fluid connectors 220 may define one or more fluid circuits, or even a single fluid circuit, which may be open loop or closed loop, depending on the type of cooling fluid and system in which the electric machine 200 is incorporated into.

Control and power may be provided by one or more power module systems. For example, as shown, the electric machine 200 includes a first power module system 222 and a second power module system 224. The power module systems 222, 224 may be configured with various electrical and electronic elements to control, condition, or otherwise provide electrical elements for the electric machine 200. For example, and without limitation, the first power module system 222 may be configured with DC bus capacitors and the second power module system 224 may be configured with PCB control elements or the like. It will be appreciated that additional power module systems may be employed and/or the two power module systems 222, 224 of the illustrative configuration may be arranged as a single power module system providing the same functionality, as determined by the specific application and configuration of the electric machine and/or greater system in which the electric machine 200 is employed. In accordance with some embodiments of the present disclosure, the power module systems 222, 224 or equivalents thereof may be configured to provide active rectification to electrical power of the electric machine 200.

The rotor 204 of the electric machine 200 may include a laminated rotor 226 and a rotor sleeve 228. The laminated rotor 226 may be fixedly attached to or mounted to the shaft 206. In some embodiments, the laminated rotor 226 may be integrally formed with or part of the shaft 206 and not separately attached thereto. The rotor sleeve 228 may be provided to contain the laminated rotor 226 and, in some configurations, may be provided to ensure that there is no contact between the material of the laminated rotor 226 and the structure/material of the stator 202.

The electric machine 200 can provided an increased power density with reduced cost and improved fault tolerance, modularity, and manufacturability as compared to conventional electric machines (i.e., convention rotor/stator systems). In some embodiments, the electric machine 200 can be arranged as a modular, switched reluctance generator that includes an active rectifier (e.g., provided by the power module systems 222, 224 or the like). The electric machine 200 may be used onboard aircraft, for example, for both starter operations of an engine, APU, or the like, and also for main generator operation (e.g., in flight power generation). By providing an active rectifier with switched reluctance, the electric machine 200, and similar systems in accordance with the present disclosure, can lead to removing unnecessary filters to meet output power quality requirements. That is, the electric machine 200 may provide for reduced component and complexity systems.

As noted above, the stator 202 includes a stator assembly 210 that is assembled from one or more stator segments 212. In a system with the fewest number of stator segments 212, the entire stator assembly 210 is formed of a single, annular ring or similar arrangement with teeth extending radially inward from a backing (e.g., in a radially inward direction from the frame 208). However, to increase modularity, improve assembly and maintenance operations, and the like, the stator assembly 210 may be formed from two or more separate stator segments 212 (e.g., stator segments 212*a*, 212*b*, 212*c*) that are assembled within the frame 208. As shown in FIG. 2C, the stator segments 212 may have differing configurations. For example, a first stator segment 212*a* (three shown) may be defined as the smallest unit, having a single tooth and winding 214 configuration. The next largest unit is shown as second stator segments 212*b*, which each include two teeth and sets of windings 214 about the teeth. Finally, in FIG. 2C, the largest illustrated segment is the third stator segment 212*c*, which is formed of a structure having four teeth and associated windings 214. It will be appreciated that other numbers of teeth/windings may be implemented for the stator segments, and the illustrative structures are merely for illustrative and explanatory purposes. For example, as noted, the stator segment may be a single annular or ring-like structure, without departing from the scope of the present disclosure.

The windings 214 include slots configured to receive the cooling elements 216 between one or more of the wires forming the windings 214. This can allow the cooling elements 216 to distribute cooling fluid through cooling channels 230 (FIG. 2C) between the windings 214 as well as "into" the windings 214 themselves. As shown in FIG. 2C, each cooling element 216 includes a primary segment 232 and one or more secondary segments 234. The primary segments 232 may be provided between adjacent sets of windings 214, and in this configuration, extend in a generally radial direction. As such, the primary segments 232 are arranged to provide cooling to two windings 214. The secondary segments 234 of the cooling elements 216 are arranged to provide cooling to a single winding 214 and extend generally in a direction normal to the primary segment 232. The orientation of the secondary segments 234 is not limited to only normal to the primary segment 232, but rather, the secondary segments 234 may extend at any angle relative to the primary segment 232 and extend inward toward the stator segment 212 about which a winding 214 is wrapped. The illustrated example cooling channels 230 and associated fluid connectors 220 are arranged to cause a cooling fluid to flow in and out of the cooling channels 230. In one embodiment, the fluid connectors 220 and the cooling channels 230 may contact the cold plate 218. In some configurations, the fluid connectors 220 and the cooling channels 230 in the cooling elements 216 can provide for a serpentine path for a cooling fluid (e.g., oil, water, refrigerant, etc.) through the windings 214. In addition to providing a mechanism for supplying a cooling fluid into and through the windings 214, the cold plate 218 may also be configured to operate as a heat sink for the power module systems 222, 224. That is, the electronic components that may generate heat within the power module systems 222, 224 may be arranged to thermally interact with the cold plate 218, and thus the cold plate 218 may operate to provide cooling to both the windings 214 and the electronics of the power module systems 222, 224.

As shown in FIGS. 2A-2C, the electric machine 200 is formed of a variety of components that are assembled together. Some of the components may be formed of subcomponents, which are also assembled together to form the associated component. For example, the stator assembly 210, in this illustrative configuration, is formed from an assembly of multiple stator segments 212 which are enclosed within the frame 208. Each stator segment 212 will have at least one tooth structure about which a winding 214 may be wrapped. The segmented nature of the stator 202 provides for modularity where each modular element has at least one tooth, a winding about the tooth, and one or more cooling elements associated therewith. It shall be understood that in one or more embodiments, the stators, the rotor, any associated electronics and/or the cold plate could also be modular elements than can be separately formed/tested and then assembled together.

Figure 3:
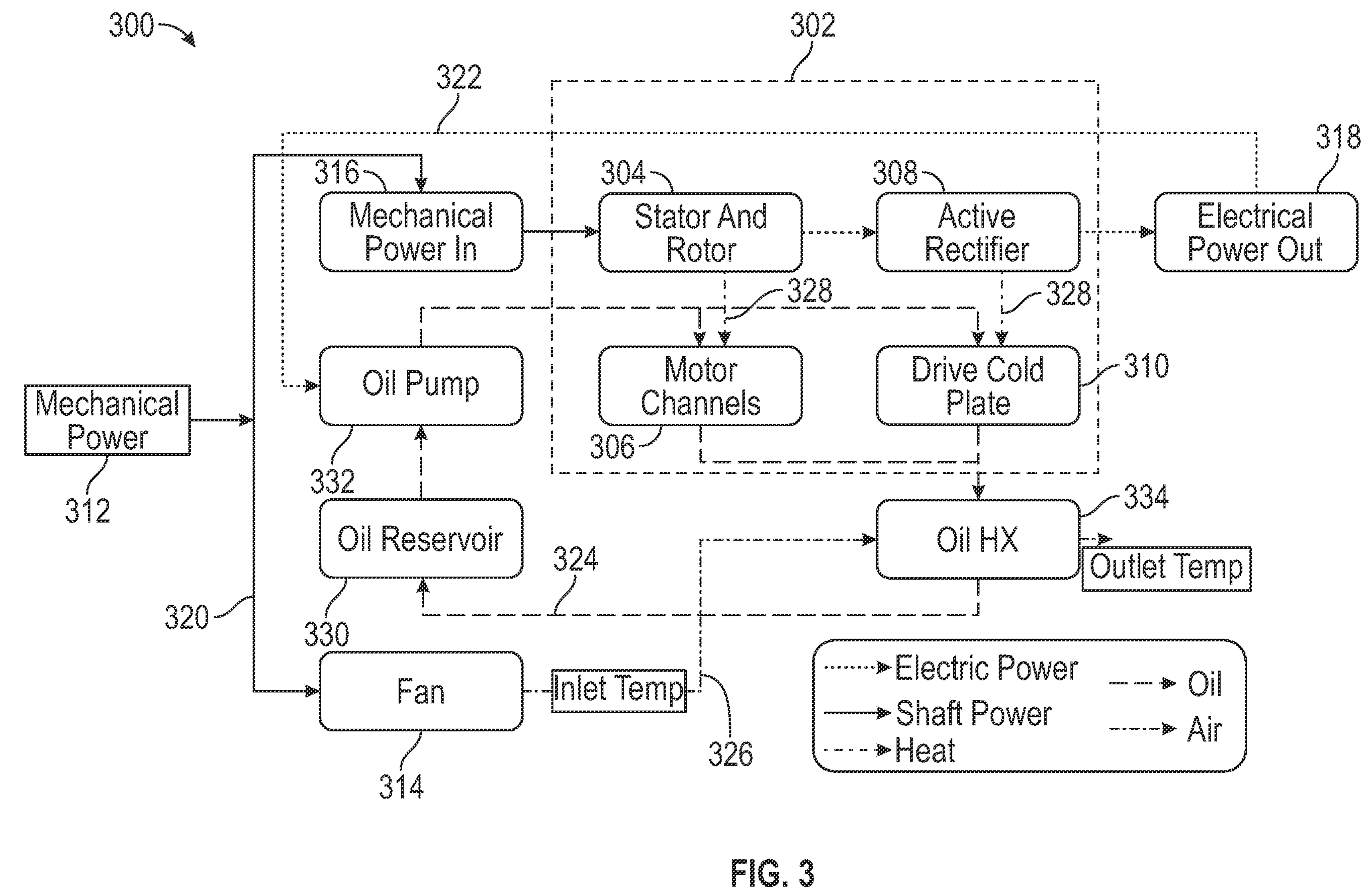
FIG. 3 is a schematic diagram of a system that may incorporate electric machines in accordance with embodiments of the present disclosure.

Referring now to FIG. 3, a system 300 that includes an electric machine 302 in accordance with embodiments of the present disclosure. The electric machine 302 may be configured similar to that shown and described above, including, for example and without limitation, a stator and rotor assembly 304 having cooling channels 306, an active rectifier 308, and a cold plate 310. As shown in FIGS. 2A-2C and FIG. 3, the cold plate and the rectifier are part of the electric machine (or mounted thereto). However, in other embodiments and configurations, these pieces may not all be required. The components of the electric machine 302 (e.g., active generator components such as the stator and rotor 304, the active rectifier 308, and the associated thermal management system 306, 310) are incorporated into the large system 300.

In this illustrative configuration, the system 300 is configured as an electrical generation system which converts mechanical energy into electrical energy. It will be appreciated, however, that the system 300 may be arranged in substantially reverse configuration to be a mechanical generation system which converts input electrical energy into mechanical energy output. The system 300 has a mechanical power input 312, such as a shaft of an engine of an aircraft or the like. The mechanical power input 312 may drive operation of a fan 314 and may drive rotation of a rotor input 316, such as a shaft that is fixedly connected to the rotor of the stator and rotor 304. The fan 314 may be configured to drive air through a portion of the system 300. As the rotor of the stator and rotor 304 is rotated by the rotor input 316, an electromagnetic field will be induced by the rotating rotor relative to the stator, which creates an electric current in the windings of the stator. The electric current may be passed through the active rectifier 308 and supplied to an electrical power output 318.

As shown in FIG. 3, the system 300 includes various connections associated with operation of the system 300. In FIG. 3, line 320 indicates mechanical power (e.g., shaft power), line 322 indicates electrical power, line 324 indicates a flow of oil or other cooling fluid (e.g., water, refrigerant, heat exchange fluid, or the like), line 326 indicates a flow of air, and line 328 indicates a flow of heat (e.g., between components). As shown, the mechanical power line 320 connects the mechanical power input 312 to each of the fan 314 and the rotor input 316. The stator and rotor 304 will convert the mechanical power into electrical power which is passed through the active rectifier 308 and then output as the electrical power output 318. The electrical power output 318 may be used to power various electrical components or devices that are part of the system 300 and/or a structure of vehicle in which the system 300 is implemented (e.g., aircraft electronics).

The cooling channels 306 may be configured to pick up heat from the windings of the stator of the stator and rotor 304. The cold plate 310 may be configured to pick up heat from the active rectifier 308. Each of the cooling channels 306 and the cold plate 310 may receive oil (or some other cooling system fluid such as oil, water-glycol, coolant, or refrigerant). Starting at a coolant reservoir 330 that contains the coolant in the coolant loop 324, the coolant fluid may be driven by a coolant pump 332. The coolant pump 332 may be an electrical device that received electrical power from the electrical power output 318. The coolant fluid is then pumped into and through the cooling channels 306 and the cold plate 310. The coolant fluid will pick up heat, as indicated by lines 328, from the stator and rotor 304 (e.g., the windings of the stator) and from the active rectifier 308. The heated coolant fluid will then pass into a coolant heat exchanger 334, where the picked up heat in the coolant fluid will be rejected into the air stream provided by the fan 314 and indicated by line 326. The cooled coolant fluid will then be cycled back into the coolant reservoir 330. As a result, the coolant loop, indicated by line 324, may be a closed-loop cycle for providing heat pick up and heat rejection from components of the electric machine 302.

In one or more embodiments, each component may be represented by a reduced-order, physics-based model that relates design choices (e.g., number of slots, number of poles, frequency, speed, cooling channel dimensions, etc.) and operating conditions (e.g., current density, oil flow rate, pressure drop, etc.) to optimize size and weight while meeting the performance requirements. This model enables a holistic system design that minimizes weight, volume, cost, and manufacturing complexities while meeting performance targets and limitations (e.g., efficiency, reliability, etc.). The output of the model(s) also provides requirements and a starting point for more detailed system and component design.

Figure 4A:
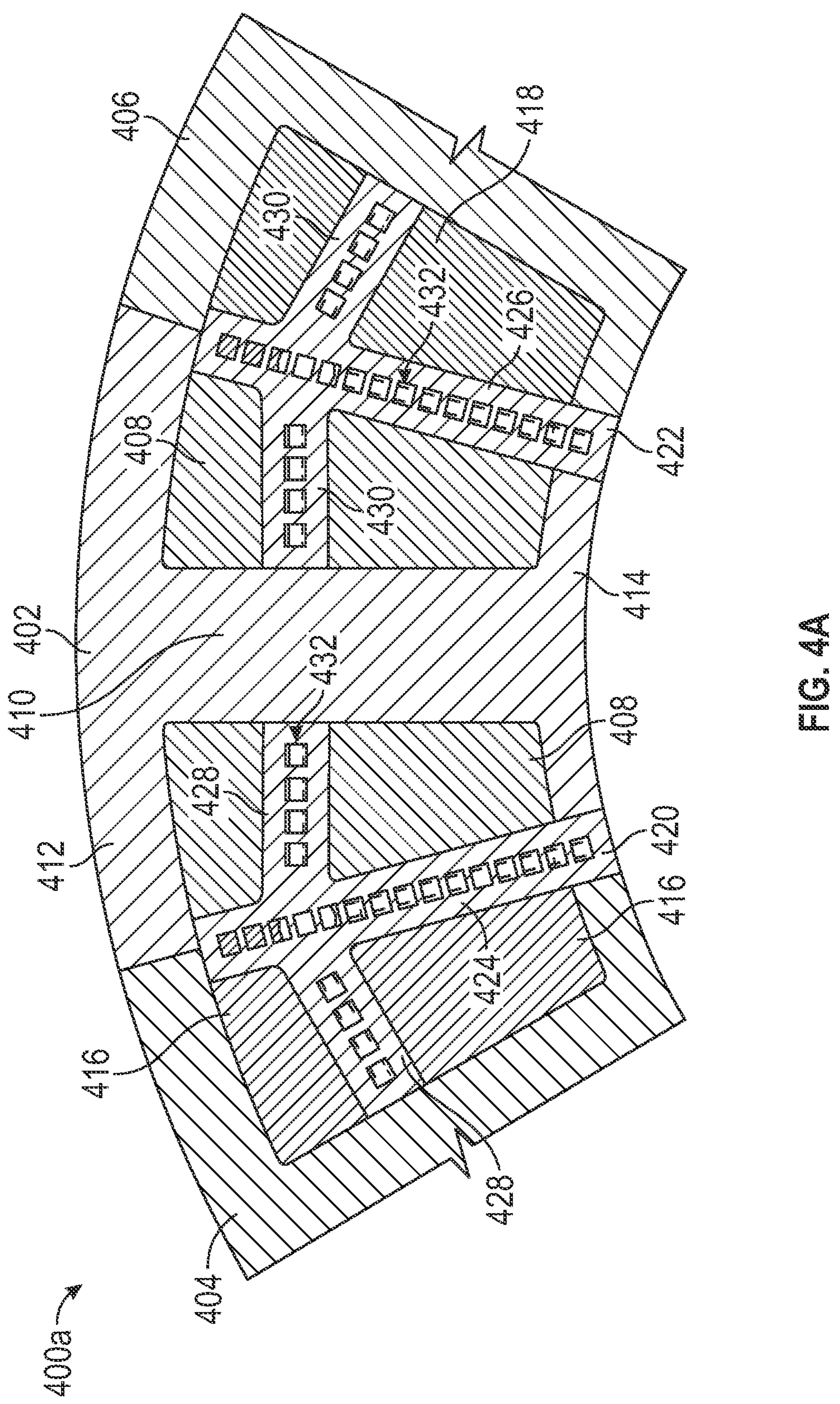
FIG. 4A is a schematic illustration of a portion of a stator assembly of an electric machine in accordance with an embodiment of the present disclosure.
Figure 4B:
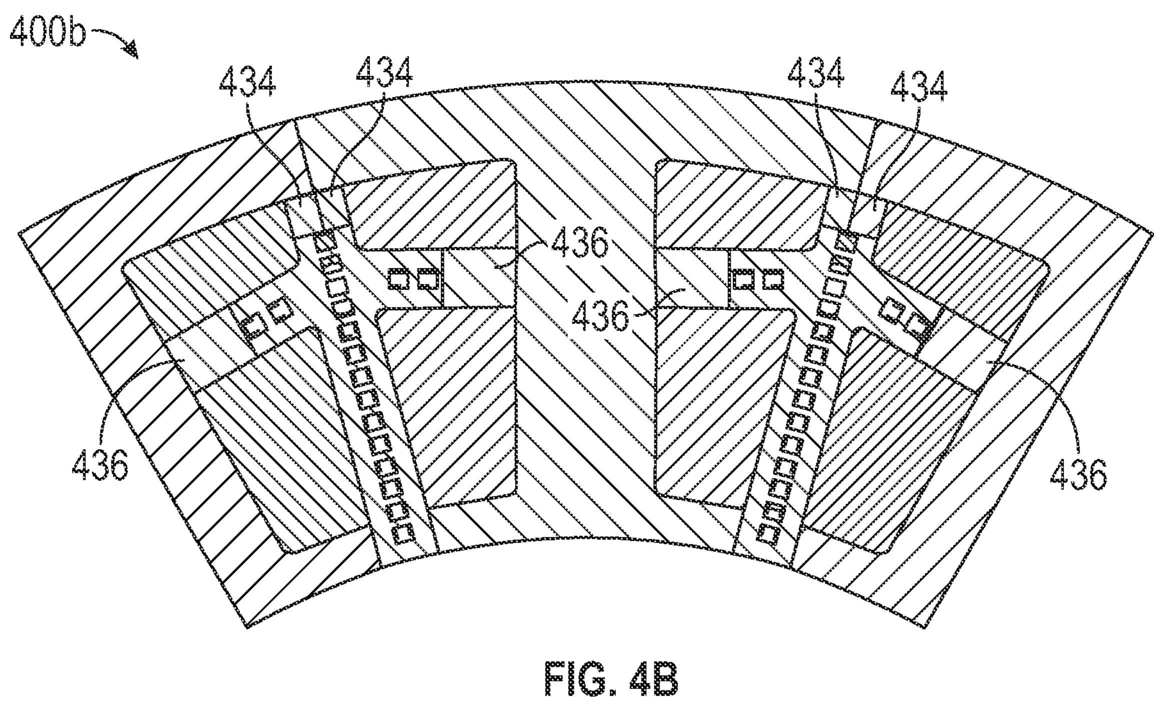
FIG. 4B is a variation on the stator assembly of FIG. 4A in accordance with an embodiment of the present disclosure.
Figure 4C:
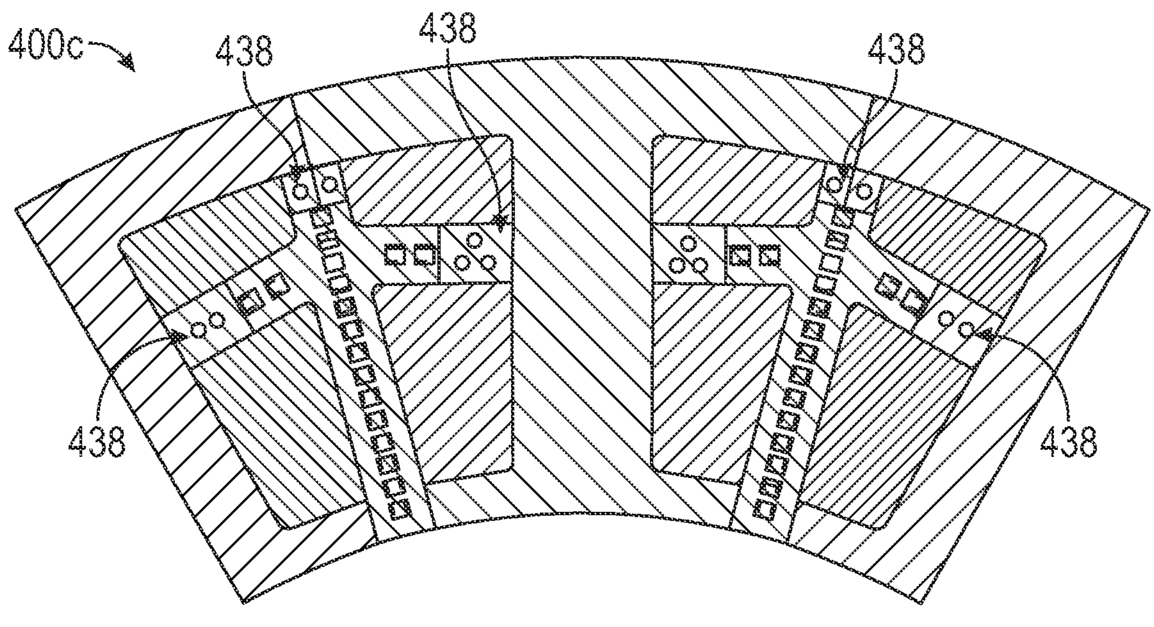
FIG. 4C is another variation on the stator assembly of FIG. 4A in accordance with an embodiment of the present disclosure.

Referring now to FIGS. 4A-4C, schematic illustrations of a portion of a stator 400*a*, 400*b*, 400*c* according to embodiments of the present disclosure are shown. The stator 400*a* of FIG. 4A illustrates the modularity or segmented nature of an example stator in accordance with some embodiments of the present disclosure. As shown, the stator 400*a* includes a first stator segment 402, a second stator segment 404, and a third stator segment 406. In this illustration, the first stator segment 402 is arranged between the second stator segment 404 and the third stator segment 406, and the second stator segment 404 and the third stator segment 406 are partially shown. The complete structure of the second stator segment 404 and the third stator segment 406 may be substantially the same as that of the first stator segment 402.

The stator segment 402 has a structure arranged to be wound with a winding 408. The stator segment 402 has a center body 410 that extends in a radial direction when installed relative to a rotor. The center body 410 has an outer diameter portion 412 extending tangentially or circumferentially from the center body 410 at an outer diameter end thereof and an inner diameter portion 414 extending tangentially or circumferentially from the center body 410 at an inner diameter end thereof (e.g., relative to an axis through the stator). The stator segment 402 has an axial length that extends into and out of the page of FIG. 4A, and has a general I-beam shape in this configuration. The center body 410 and the inner and outer diameter portions 412, 414 provide a structure about which the winding 408 can be wrapped. As noted, the second stator segment 404 and the third stator segment 406 may be configured similarly, having respective center bodies and inner and outer diameter segments with respective windings 416, 418 wrapped thereabout.

The stator segments 402, 404, 406 may be assembled to form the stator 400*a* with cooling elements 420, 422 arranged between adjacent stator segments 402, 404, 406. For example, as shown, a first cooling element 420 is arranged between the first stator segment 402 and the second stator segment 404 and a second cooling element 422 is arranged between the first stator segment 402 and the third stator segment 406. The first cooling element 420 is arranged to provide cooling to the windings 408 of the first stator segment 402 and the windings 416 of the second stator segment 404. Similarly, the second cooling element 422 is arranged to provide cooling to the windings 408 of the first stator segment 402 and the windings 418 of the third stator segment 406. The cooling elements 420, 422 each have radial extending primary cooling bodies 424, 426, respectively. Extending in a tangential or circumferential direction, each cooling element 420, 422 has respective secondary cooling extensions 428, 430 that extend from the respective primary cooling body 424, 426. The primary cooling bodies 424, 426 and the secondary cooling extensions 428, 430 include cooling channels 432 therein. The cooling channels 432 are arranged to receive a cooling fluid and to direct such cooling fluid through the cooling elements 420, 422 to pickup heat from the windings 408, 416, 418.

In some configurations, the cooling channels 432 of the first cooling element 420 may be fluidly connected to the cooling channels 432 of the second cooling element 422. For example, the cooling channels 432 of the first cooling element 420 may be connected to the cooling channels 432 of the second cooling element 422 by a fluid connector or the like (e.g., as shown in FIG. 2B). The source of the cooling fluid into the cooling channels 432 may be from a cold plate or the like, as shown and described above. As such, a continuous flow path of a cooling fluid may be provided through the stator 400*a*. In other configurations, the cooling channels 432 may be separately coupled to the cold plate. In such configurations, the cooling channels 432 may be fluidly connected through the cold plate, rather than directly connected to each other.

As shown, the cooling elements 420, 422 extend radially from an inner diameter end to an outer diameter end, but are enclosed by the outer diameter portions (412) of the stator segments 402, 404, 406. On the inner diameter end, the cooling elements 420, 422 may, as shown, extend to an inner diameter surface of the stator 400*a*, and thus may not be enclosed in a radial direction by the structures of the stator segments 402, 404, 406. It will be appreciated that in other configurations, the cooling elements 420, 422 may be wholly radially enclosed by the inner and outer diameter portions (412, 414) of the stator segments 402, 404, 406. In still other configurations, the cooling elements 420, 422 may extend the same radial distance at both the inner diameter end and the outer diameter end as the stator segments 402, 404, 406.

The configuration of FIG. 4A illustrates the smallest size stator segment (e.g., unit size), having a single center body and winding wrapped thereabout. However, in other embodiments, the stator segments may be large, encompassing more than one center body. For example, the structure of the first stator segment 402 and the second stator segment 404 may be unitarily formed as a single body and not separated from each other, such as shown and described with respect to FIG. 2C. In such a configuration, each larger stator segment may include multiple windings wrapped about adjacent center bodies of the larger (multi-part) stator segment (e.g., stator segments 212*b*, 212*c* shown in FIG. 2C).

The stator 400*a* may be configured with one or more secondary cooling features to provide additional cooling to the windings and/or the material of the stator itself (e.g., the laminate structure). For example, FIG. 4B illustrates a variation of a stator 400*b* that includes carriable passive, in-slot structures 434, 436. The in-slot structures 434, 436 may be formed of the laminate material to provide a thermal path for cooling of the laminates and/or outer jacket of the stator 400*b*. Furthermore, as shown in FIG. 4C, the in-slot structures of the stator 400*c* may each include one or more airflow channels 438 therein. The airflow channels 438 may be fluidly coupled to a cooling air source that directs a flow of air through the airflow channels 438 for heat pickup from the in-slot structures 434, 436 and/or the laminate material of the stator segments 402, 404, 406. Various other types of secondary cooling may be provided using liquid cooling, air cooling, phase-change materials, or the like. The structure of the cooling elements and/or the stator segments may be adjusted or modified (e.g., as shown in FIGS. 4B-4C) to accommodate various secondary cooling schemes, without departing from the scope of the present disclosure.

Additionally, although shown with a substantially "t" shaped configuration in the embodiments of FIGS. 4A-4C, the cooling elements of the present disclosure are not be limited to such a single geometry. For example, referring now to FIGS. 5A-5B, schematic illustrations of alternative configurations of stators 500*a*, 500*b* having respective cooling elements 502*a*, 502*b* are shown.

Figure 5A:
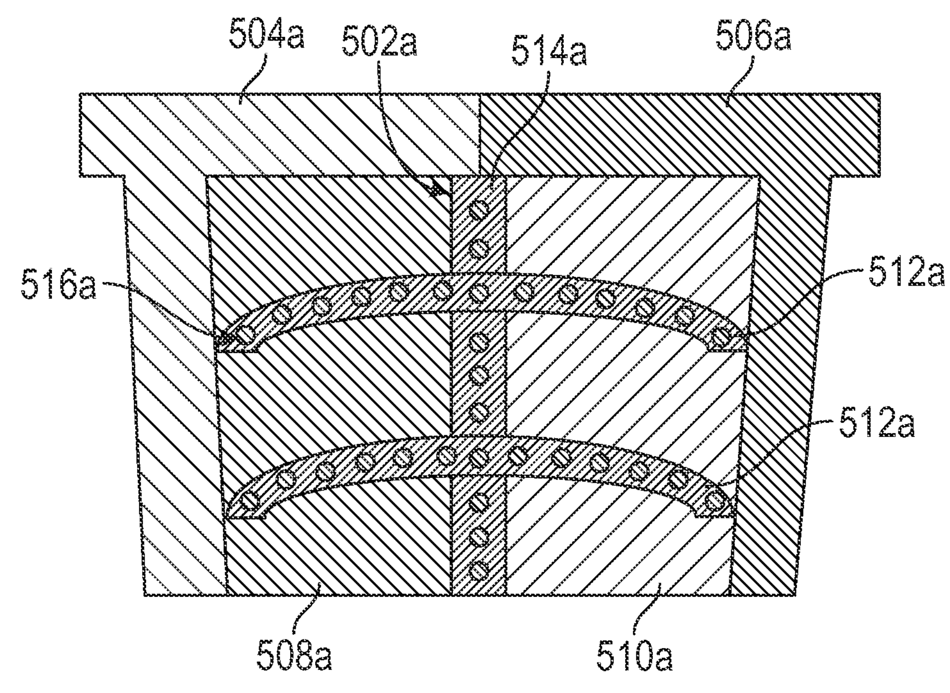
FIG. 5A is a schematic illustration of a portion of a stator assembly of an electric machine showing a first example configuration of a cooling element in accordance with an embodiment of the present disclosure.

FIG. 5A illustrates a first stator 500*a* having a first stator segment 504*a* and a second stator segment 506*a* with a cooling element 502*a* arranged therebetween. The first stator segment 504*a* has a first winding 508*a* wrapped around the structure of the first stator segment 504*a* (partially shown) and the second stator segment 506*a* has a second winding 510*a* wrapped around the structure of the second stator segment 506*a* (partially shown). In this configuration, the cooling element 502*a* includes two sets of secondary cooling extensions 512*a* that extend from a primary cooling body 514*a* of the cooling element 502*a*. The secondary cooling extensions 512*a* may be arranged at different radial positions along the primary cooling body 514*a*. In this configuration, the secondary cooling extensions 512*a* are illustratively shown as having the same geometry and orientation. However, such configuration is not intended to be limiting.

Figure 5B:
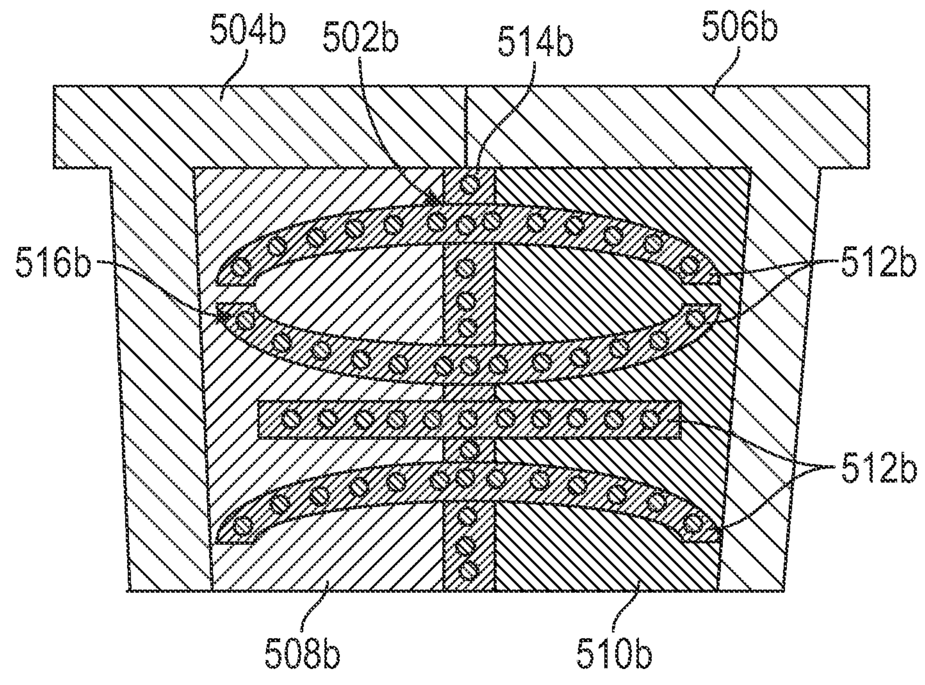
FIG. 5B is a schematic illustration of a portion of a stator assembly of an electric machine showing a second example configuration of a cooling element in accordance with an embodiment of the present disclosure.

For example, as shown in FIG. 5B, a second stator 500*b* includes a first stator segment 504*b* and a second stator segment 506*b* with a cooling element 502*b* arranged therebetween. The first stator segment 504*b* has a first winding 508*b* wrapped around the structure of the first stator segment 504*b* (partially shown) and the second stator segment 506*b* has a second winding 510*b* wrapped around the structure of the second stator segment 506*b* (partially shown). In this configuration, the cooling element 502*b* includes four sets of secondary cooling extensions 512*b* that extend from a primary cooling body 514*b* of the cooling element 502*b*. The secondary cooling extensions 512*b* may be arranged at different radial positions along the primary cooling body 514*b*. Further, as shown, the different secondary cooling extensions 512*b* may have different geometries and/or orientations, to provide cooling to the windings 508*b*, 510*b*.

Those of skill in the art will appreciate that the cooling elements of the present disclosure may have any number of secondary cooling extensions. Further, for any given cooling element, the secondary cooling extensions may have different shapes, sizes, orientations, geometries, or the like. It will be appreciated that in the cooling elements 502*a*, 502*b*, the primary cooling bodies 514*a*, 514*b* and the secondary cooling extensions 512*a*, 512*b* will include cooling channels 516*a*, 516*b* to enable conveyance of a cooling fluid through the cooling elements 502*a*, 502*b*.

In embodiments in accordance with the present disclosure, no magnets are employed within the stator or rotor. Rather, in accordance with embodiments of the present disclosure, the stator may be formed of laminated stator segments, as shown and described above, with windings wrapped about the structure of the stator segments. Arranged between the stator segments and windings are cooling elements which provide heat pickup and cooling to the windings. Furthermore, the rotor of the electric machines of the present disclosure include rotor teeth that have spaces between adjacent teeth to provide a reluctance path therethrough.

For example, with reference again to FIG. 2C, the rotor 204 may be formed as a laminated rotor 226 with rotor teeth 236 having gaps 238 defined between adjacent rotor teeth 236 in a circumferential direction. The gaps 238 may be air gaps. The gaps 238 provide a region for reluctance paths to form in the electric machine 200. The rotor teeth 236 of the laminated rotor 226 may be formed from materials such as, for example and without limitation, various magnetic metals, including magnetic steels (e.g., silicon-iron, cobalt-iron, etc.). As the electric machine 200 is operated, the electromagnetic fields induced by a current within the windings 214 will pass into the gaps 238 and cause a driving force to act upon the rotor teeth 236 and cause rotation of the rotor 204.

The rotors of the electric machines disclosed herein can be, for example, a Switched Reluctance generator that operates across a wide speed range. One example operating condition is at 65 kW, +270 Vdc. The electric machines of the present disclosure can be, for example a rare earth permanent magnet-free or magnet-less Switched Reluctance generator. The electric machines of the present disclosure can include, for example, any of the cooling channels and cooling elements disclosed herein or other configurations thereof for cooling of windings of the stator. As noted above, the electric machines disclosed herein can include modular architectures for easy manufacturability and maintenance and may have active controls that enable operation of the system both as a starter (e.g., to initiate start-up of an aircraft engine) and generator (e.g., to generate onboard electrical power). By having a modular or segmented stator, as shown and described above, fault tolerance can be improved compared conventional systems, as a failure in one module or segment during operation may still allow the other modules or segments to continue operating. In some configurations, the stator segments may be paired such that two adjacent windings may be energized in a sequence or cyclical manner to cause a directional change in the electromagnetic fields that are induced in the gaps between the laminated rotor teeth. That is, a different in field strength between two adjacent stator segments may impart a differential to the stator teeth to cause rotation thereof.

As discussed above, the switched reluctance electric machines of the present disclosure may be designed utilizing finite element tools to predict performance leveraging an external optimization to achieved desired performance. Such performance considerations may include, without limitation, torque density, gravimetric power density, volumetric density, efficiency, and the like. The electric machines described herein may include, for example, a multi-phase, higher-pole architecture, embedded channels for in-slot cooling, elimination or lack of use of a rare earth permanent magnet within the rotor, relatively low cost materials, and modular or segmented architecture to improve fault tolerance and the like.

In accordance with embodiments of the present disclosure, a modeling system or process can be used to design an electric machine according to embodiments of the present disclosure. In one non-limiting embodiment or example of such modeling system to select a topology for an electric machine, the design process may target torque density, power density, volumetric density, and efficiency by utilizing a pre-developed finite element base optimizer. The pre-developed finite element base optimizer may take the geometry of each topology and the objective functions with additional constraints as inputs, relying on a finite element program or the like to obtain a performance of a specific design or configuration. With such a configuration, optimization may be carried out by another optimization program such as a genetic evolution base optimization program.

The resulting design for an electric machine in accordance with embodiments of the present disclosure may include a switched reluctance operation with an active rectifier. In accordance with some embodiments, the electric machines of the present disclosure may include a wide band gap (WBG) active rectifier with low loss operation at high switching frequency. Such devices may include silicon carbide (SiC) or gallium nitride (GaN) materials for high power density. For example, SiC based device-based modules or GaN based high performance switches may be used to realize the high performance, ultra high-density power electronic interface to a switched reluctance machine, while minimizing the cost of the system.

In some embodiments, the inductance of the electric machine may be used for rectification and DC bus regulation. For example, the inductance of the machine may be utilized as an interfacing inductance (e.g., boost inductor) of the rectifier and may improve power density and reduce cost. Furthermore, active controls may be provided to enable operation as both a starter (e.g., for an aircraft engine) and a generator (e.g., for power generation onboard an aircraft). By implementing electric machines as described herein, fast dynamic responses may be achieved for step loads and the like. Use of WBG devices may provide an increase of 2-3 times power density as compared to conventional electric machine configurations, while providing a loss rejection of 50% or greater. Additionally, by configuring the electric machines, and the stators thereof, as described above, the modularity or segmented nature of the devices can provide improved fault tolerances.

In accordance with embodiments of the present disclosure, local liquid cooling of generator coils (e.g., stator windings) is enabled by embedding fluid channels (also referred to as cooling channels within cooling elements) in the slots between and within the windings of the stator. Such an arrangement can reduce the thermal resistance between the heat source (windings/coils) and the heat sink (fluid in channels). The embedded channels can be additively manufactured to enable highly integrated custom designs. The working fluid or cooling fluid, as noted above, may be oil, water-glycol, refrigerant, or the like. In some configurations, the cooling fluid may be part of another system, such as onboard an aircraft of the like, or a cooling fluid loop or cycle may be integrated into other systems (e.g., as shown in FIG. 3). In various embodiments of the present disclosure, the cooling may take the form of conformal cooling channels or spray/immersion cooling at the end windings. Plenums for supplying the cooling fluid may be spatially integrated with the headers and/or cold plate for in-slot cooling.

Figure 6:
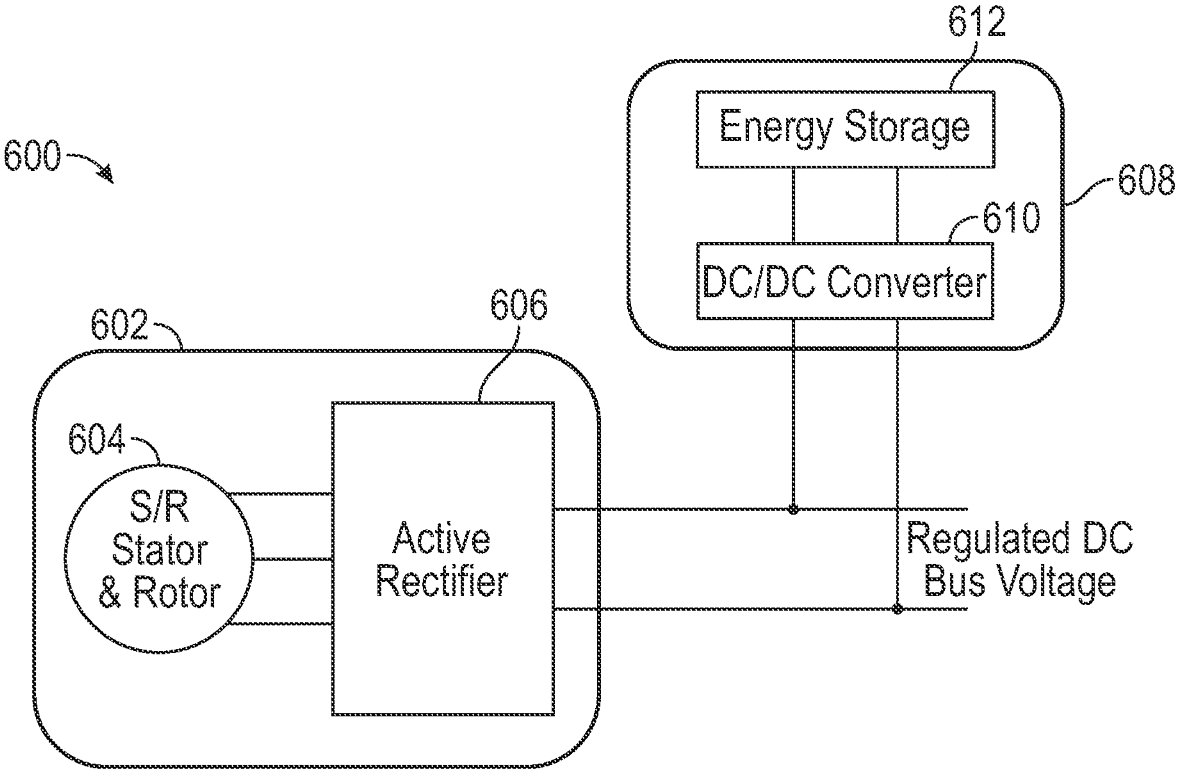
FIG. 6 is a schematic diagram of an electric system that may incorporate embodiments of the present disclosure.

Referring now to FIG. 6, an example power generation system architecture 600 that includes an electric machine 602 in accordance with an embodiment of the present disclosure is shown. The electric machine 602 includes a switched reluctance stator/rotor system 604 and an active rectifier 606. The electric machine 602 may be configured as a generator to convert mechanical power (e.g., shaft input) into electrical power. As such, the electric machine 602 is electrically connected to a regulated DC bus voltage system, such as an aircraft electrical system. Arranged along the electric system may be a high energy storage system 608 that includes a DC/DC converter 610 and an energy storage device 612.

Figure 7:
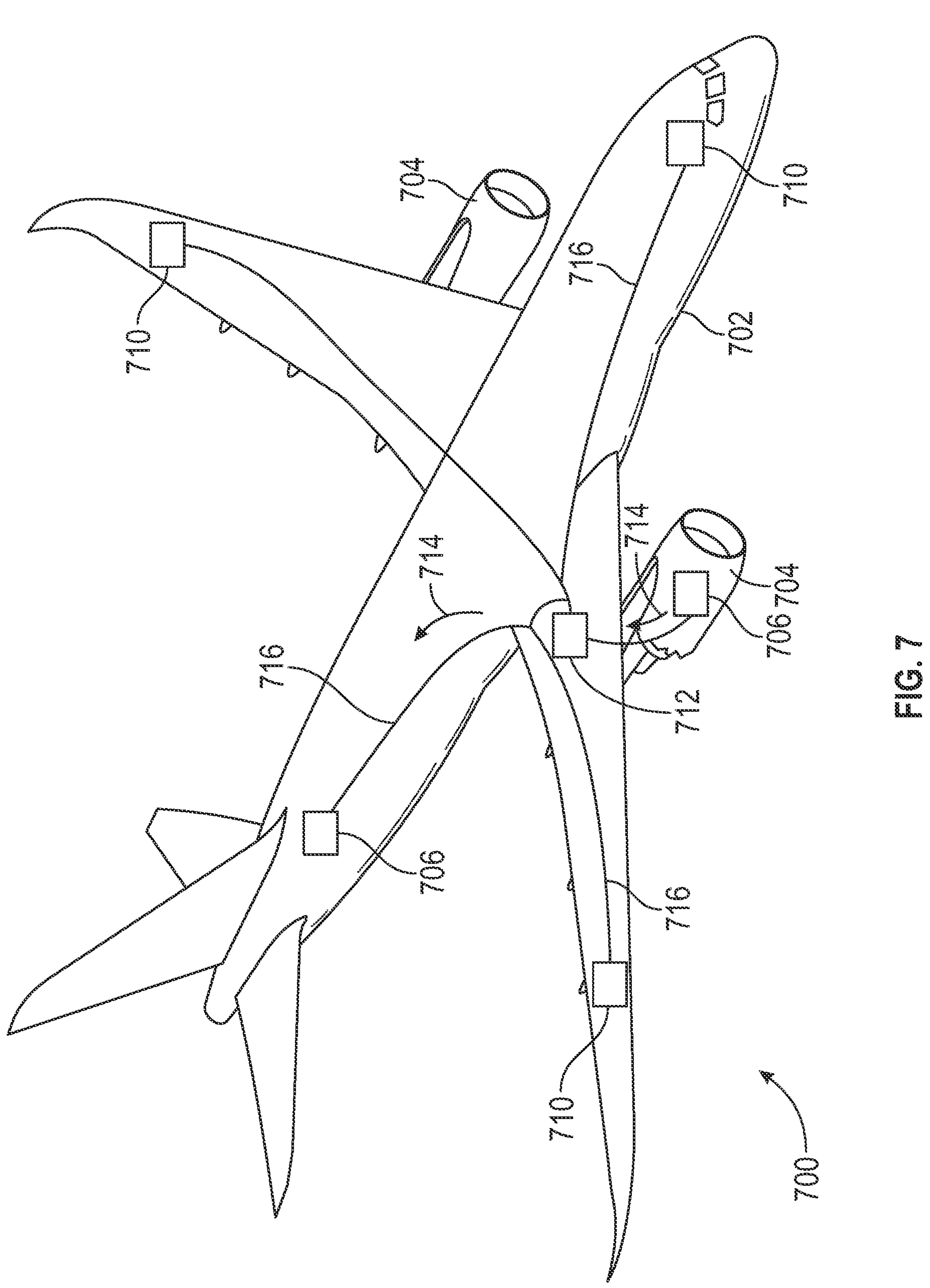
FIG. 7 is a schematic illustration of an aircraft incorporating embodiments of the present disclosure.

Referring to FIG. 7, a power system 700 of an aircraft 702 is shown. The power system 700 includes one or more engines 704, one or more electric machines 706, a power bus electrically connecting the various power sources 704, 706, and a plurality of electrical devices 710 that may be powered by the engines 704 and/or electric machines 706. The power system 700 includes a power distribution system 712 that distributes power 714 through power lines or cables 716. The electric machines 706 may be configured in accordance with the above described embodiments and variations thereof.

Advantageously, embodiments of the present disclosure provide for improved electric machines for aircraft and aviation applications. The electric machines described herein may eliminate the need for magnets and operates using a modular switched reluctance generator. The modularity or segmented nature of the stator provides for improved loss reductions and fault tolerance. For example, if one stator segment (having one or more windings) fails, a maintenance operation may require only replacement or repair of the single stator segment, rather than a replacement of the entire stator. Furthermore, advantageously, by using a laminated rotor having gaps between rotor teeth, and a switched reluctance stator operating, rotation of the rotor may be induced through controlled operation of the stator windings.

The terms “about” and “substantially” are intended to include the degree of error associated with measurement of the particular quantity based upon the equipment available at the time of filing the application. For example, “about” or “substantially” can include a range of ±8% or 5%, or 2% of a given value.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft electric machine comprising:

a laminated rotor operably connected to a shaft, the laminated rotor comprising a plurality of rotor teeth and air gaps defined between adjacent rotor teeth about a circumference of the laminated rotor;

a modular stator assembly comprising at least one stator segment having a winding wrapped about a center body of the at least one stator segment;

a cooling element arranged at least one of adjacent to or within the winding; and at least one power module system comprising an active rectifier and wherein the laminated rotor and modular stator are arranged as a switched reluctance rotor-stator assembly, wherein the cooling element comprises a primary cooling body arranged in a radial orientation relative to the shaft and at least one secondary cooling extension that extends from the primary cooling body in a direction tangential or circumferential relative to the shaft and at least one of the primary cooling body and the at least one secondary cooling extension comprise a secondary cooling feature configured to provide cooling to material of the at least one stator segment.

2. The aircraft electric motor of claim 1, wherein the center body is a first center body and the at least one stator segment comprises a second center body adjacent the first center body, wherein the first center body is wrapped with a respective first winding and the second center body is wrapped with a respective second winding.

3. The aircraft electric motor of claim 2, wherein the at least one power module is configured to selectively direct current into the first winding and the second winding.

4. The aircraft electric motor of claim 1, further comprising a cooling system configured to supply a cooling fluid into the cooling element to provide cooling to the winding.

5. The aircraft electric motor of claim 4, wherein the cooling system comprises a cold plate and at least one fluid connector configured to fluidly connect the cold plate to the winding and provide a flow path for the cooling fluid.

6. The aircraft electric motor of claim 1, wherein the cooling element comprises a primary cooling body arranged in a radial orientation relative to the shaft and at least one secondary cooling extension that extends from the primary cooling body in a direction tangential or circumferential relative to the shaft.

7. The aircraft electric motor of claim 6, wherein the primary cooling body is arranged adjacent the winding and the at least one secondary cooling extension extends into the winding.

8. The aircraft electric motor of claim 6, wherein each of the primary cooling body and the at least one secondary cooling extension define internal cooling channels to receive a cooling fluid to pick up heat from the winding.

9. The aircraft electric motor of claim 6, wherein the at least one secondary cooling extension comprises two or more secondary cooling extensions that are arranged at different radial positions along the primary cooling body.

10. The aircraft electric motor of claim 1, wherein neither the laminated rotor nor the modular stator includes a magnet.

11. The aircraft electric motor of claim 1, wherein the air gaps defined between adjacent rotor teeth are configured to define a reluctance path within the laminated rotor.

12. An aircraft electric machine comprising:

a laminated rotor operably connected to a shaft, the laminated rotor comprising a plurality of rotor teeth and air gaps defined between adjacent rotor teeth about a circumference of the laminated rotor;

a modular stator assembly comprising at least one stator segment having a winding wrapped about a center body of the at least one stator segment;

a cooling element arranged at least one of adjacent to or within the winding; and at least one power module system comprising an active rectifier and wherein the laminated rotor and modular stator are arranged as a switched reluctance rotor-stator assembly, wherein the cooling element comprises a primary cooling body arranged in a radial orientation relative to the shaft and at least one secondary cooling extension that extends from the primary cooling body in a direction tangential or circumferential relative to the shaft and each of the primary cooling body and the at least one secondary cooling extension define internal cooling channels to receive a cooling fluid to pick up heat from the winding.

13. The aircraft electric motor of claim 12, wherein the center body is a first center body and the at least one stator segment comprises a second center body adjacent the first center body, wherein the first center body is wrapped with a respective first winding and the second center body is wrapped with a respective second winding.

14. The aircraft electric motor of claim 12, further comprising a cooling system configured to supply a cooling fluid into the cooling element to provide cooling to the winding.

15. The aircraft electric motor of claim 12, wherein the cooling element comprises a primary cooling body arranged in a radial orientation relative to the shaft and at least one secondary cooling extension that extends from the primary cooling body in a direction tangential or circumferential relative to the shaft.

16. The aircraft electric motor of claim 12, wherein neither the laminated rotor nor the modular stator includes a magnet.

17. The aircraft electric motor of claim 12, wherein the air gaps defined between adjacent rotor teeth are configured to define a reluctance path within the laminated rotor.

18. An aircraft electric machine comprising:

a laminated rotor operably connected to a shaft, the laminated rotor comprising a plurality of rotor teeth and air gaps defined between adjacent rotor teeth about a circumference of the laminated rotor;

a modular stator assembly comprising at least one stator segment having a winding wrapped about a center body of the at least one stator segment;

a first cooling element arranged at least one of adjacent to or within the winding and arranged on a first side of the winding;

a second cooling element arranged on a second side of the winding opposite the first cooling element, wherein the first cooling element is fluidly connected in series to the second cooling element by at least one fluid connector, such that a cooling fluid will pass through the first cooling element and then the second cooling element;

at least one power module system comprising an active rectifier and wherein the laminated rotor and modular stator are arranged as a switched reluctance rotor-stator assembly; and a cold plate configured to supply the cooling fluid into the first cooling element and receive the cooling fluid from the second cooling element.

19. The aircraft electric motor of claim 18, wherein the center body is a first center body and the at least one stator segment comprises a second center body adjacent the first center body, wherein the first center body is wrapped with a respective first winding and the second center body is wrapped with a respective second winding.

20. The aircraft electric motor of claim 18, wherein the cooling element comprises a primary cooling body arranged in a radial orientation relative to the shaft and at least one secondary cooling extension that extends from the primary cooling body in a direction tangential or circumferential relative to the shaft.

* * * * *